United States Patent
Palm

(10) Patent No.: US 7,697,564 B2
(45) Date of Patent: Apr. 13, 2010

(54) LONG RANGE HANDSHAKING COMMUNICATION SYSTEM FOR MULTIPLE XDSL

(75) Inventor: Stephen Palm, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1107 days.

(21) Appl. No.: 10/664,824

(22) Filed: Sep. 17, 2003

(65) Prior Publication Data

US 2005/0063322 A1 Mar. 24, 2005

Related U.S. Application Data

(60) Provisional application No. 60/411,335, filed on Sep. 17, 2002.

(51) Int. Cl.
*H04J 3/16* (2006.01)
(52) U.S. Cl. .......... 370/465; 370/277; 370/204; 370/205; 370/282; 375/220; 375/221
(58) Field of Classification Search ............ 375/326, 375/219–222, 22; 370/277, 286, 204–206, 370/352–353, 465
See application file for complete search history.

(56) References Cited

U.S. PATENT DOCUMENTS 6,678,316 B1 * 1/2004 Helms et al. ............ 375/222
7,305,001 B2 * 12/2007 Noma et al. ............ 370/402
2003/0189952 A1 * 10/2003 Long et al. ............. 370/503
2004/0105454 A1 * 6/2004 Okamura ............... 370/413

* cited by examiner

*Primary Examiner*—Kwang B Yao
*Assistant Examiner*—Nguyen Ngo
(74) *Attorney, Agent, or Firm*—Garlick Harrison & Markison; Jessica W. Smith

(57) ABSTRACT

A method for Digital Subscriber Line (DSL) handshaking begins when a remote DSL transceiver transmits first signals containing even numbered carriers for a predetermined period of time to initiate the DSL handshaking to produce R-ETONES-REQ. The processing continues when the central office DSL transceiver determines alignment of a hyperframe in accordance with a TCM-ISDN TTR. The processing continues when the central office DSL transceiver transmits first response signals containing odd numbered carriers in accordance with the alignment of the hyperframe to produce C-TONES-TTR. The processing continues when the remote DSL transceiver acquires TTR synchronization in accordance with the C-TONES-TTR. The processing continues when, after acquiring TTR synchronization, the remote DSL transceiver transmits second signals containing even numbered carriers to produce R-TONE-TTR. The processing continues when, in response to the R-TONE-TTR, the central office DSL transceiver transmits second response signals containing odd numbered carriers to produce C-GALF1-TTR. The processing continues when the remote and central office DSL transceivers exchange flag signals.

13 Claims, 5 Drawing Sheets

LONG RANGE HANDSHAKING COMMUNICATION SYSTEM FOR MULTIPLE XDSL

This invention is claiming priority under 35 USC §119(e) to provisionally filed patent application having the same title, filed on Sep. 17, 2002, and having a provisional Ser. No. 60/411,335.

BACKGROUND OF THE INVENTION

1. Technical Field

The present invention relates to communication systems, and more particularly to xDSL communication systems.

2. Description of Related Art

Most homes and businesses are connected to telephone networks using twisted pair copper wires. Until recently, these wires were used to carry data traffic in the analogue voice band. However, with the advancement of technology, particularly Digital Subscriber Line (DSL) technology, the transfer of data over the higher frequencies in the twisted pair copper wires is becoming more prevalent. The greatest advantage of DSL is that it enables data to be exchanged over the twisted pair copper wires at much higher speeds than conventional modems and analogue lines. Currently, there are many versions of DSL including, but not limited to Asymmetrical DSL (ADSL), Very high bit rate DSL (DSL), symmetrical DSL (SDSL and SHDSL), which are collectively referenced as xDSL.

In general, xDSL communication systems support high-speed data links between a Central Office (CO) of a communication service provider and DSL modems serviced by the CO. Various xDSL solutions provide high-speed communication service worldwide. In an xDSL solution, an available spectrum is subdivided into a plurality of "tones," each of which carries either downstream information from the CO to a DSL modem or upstream information from the DSL modem to the CO. While the CO may service a plurality of xDSL modems, each serviced modem is coupled to the CO via a respective twisted pair of wires. The quality of the "channel" provided by a respective twisted pair or wires that couples an xDSL modem to its servicing CO will have a substantial determination in the throughput that may be achieved between the CO and the xDSL modem.

The quality of the channel between the CO and a serviced xDSL modem depends upon a number of factors. One of these factors is distance, i.e., from the CO to the xDSL modem. Another factor is media quality, e.g., type of media, number of connections, etc. Still another factor is interference that is coupled to the twisted pair. Interference may be produced by other xDSL modems, ingress interference, impulse noise, etc. One particular type of interference results when a binder containing a number of twisted pair wires is shared by xDSL modems and TCM-ISDN (Time Compression Multiplexing-Integrated Service Digital Network) disturbers. This type of interference is prevalent within those countries that service both types of modems, e.g., Japan. In some xDSL systems, TCM-ISDN interferers limit the ability for xDSL termination equipment to operate successfully with xDSL modems.

Various Recommendations, Standards, drafts and contributions address the operation of xDSL communications. These documents include:

[G.992.1] Recommendation G.992.1 (formerly known as G.dmt), entitled "Asymmetrical Digital Subscriber Line (ADSL) Transceivers", published in June 1999 by the International Telecommunication Union.

[G.992.2] Recommendation G.992.2 (formerly known as G.lite), entitled "Splitterless Asymmetrical Digital Subscriber Line (ADSL) Transceivers", published in June 1999 by the International Telecommunication Union.

[G.994.1] Recommendation G.994.1, entitled "Handshake Procedures For Digital Subscriber Line (DSL) Transceivers", published in June 1999 by the International Telecommunication Union.

[G.996.1] Recommendation G.996.1, entitled "G.996.1: Test Procedures for Digital Subscriber Line (DSL) Transceivers", published in June 1999 by the International Telecommunication Union.

The G.994.1 is used to handshake between two ADSL modems in order to select mutual line transmission method and operating parameters. When G.994.1 was originally developed in 1999, one of the significant design discussions centered on the selection of the carriers (tones) to be used for each ADSL annex. Annex C (ADSL in the presence of TCM-ISDN) was unable to use the same tones as Annex A or Annex B because of the disturbance from TCM-ISDN in the binder.

FIG. 1 displays the timing for the HSTU-R (i.e., the remote DSL modem) initiated duplex start-up procedure. Initially, the HSTU-R is in state R-SILENT0 transmitting silence, and the HSTU-C (i.e., the central office DSL modem) is in state C-SILENT1 transmitting silence. The HSTU-R shall initiate the start-up procedure by transmitting signals from one or both of its signaling families, with phase reversals every 16 ms (R-TONES-REQ). When this has been detected by the HSTU-C, the HSTU-C shall respond by transmitting signals from one or both of its signaling families (C-TONES). When this has been detected by the HSTU-R, the HSTU-R shall transmit silence (R-SILENT1) for 50 to 500 ms and shall then transmit signals from only one signaling family (R-TONE1). The minimum detection time for C-TONES shall be 50 ms. When the HSTU-C has detected R-TONE1, it shall respond by transmitting Galfs on modulated carriers (C-GALF1). When the HSTU-R has detected Galfs, it shall respond by transmitting Flags on modulated carriers (R-FLAG1). When the HSTU-C has detected Flags, it shall respond by transmitting Flags (C-FLAG1). When the HSTU-R has detected Flags, it shall begin the first transaction. FIG. 1 further shows the timing requirements between events that shall be adhered to. $\tau_1$ is the time period from detection of a signal (e.g. R-TONE1) to the transmission of the next signal (e.g. C-GALF1).

FIG. 2 illustrates the timing for the HSTU-C initiated duplex start-up procedure. Initially, the HSTU-R is in state R-SILENT0 transmitting silence, and the HSTU-C is in state C-SILENT1 transmitting silence. The HSTU-C shall initiate the start-up procedure by transmitting signals from one or both of its signalling families (C-TONES). When this has been detected by the HSTU-R, the HSTU-R shall respond by transmitting signals from only one signalling family (R-TONE1). The minimum detection time for C-TONES shall be 50 ms. When the HSTU-C has detected R-TONE1, it shall respond by transmitting Galfs on modulated carriers (C-GALF1). When the HSTU-R has detected Galfs, it shall respond by transmitting Flags on modulated carriers (R-FLAG1). When the HSTU-C has detected Flags, it shall respond by transmitting Flags (C-FLAG1). When the HSTU-R has detected Flags, it shall begin the first transaction. FIG. 2 further shows the timing requirements between events that shall be adhered to. $\tau_1$ is the time period from detection of a signal (e.g. R-TONE1) to the transmission of the next signal (e.g. C-GALF1).

When G.994.1 was developed, those familiar with the art knew that G.994.1 successfully operated to approximately 4 km in the presence of TCM-ISDN in the binder. Advances in ADSL modem technology have suggested that ADSL could operate at distances significantly greater than 4 km. Thus a handshaking means that operates at distances greater than 4 km is needed. A need exists for this need to be met.

BRIEF SUMMARY OF THE INVENTION

The long range handshaking communication system for xDSL substantially meets these needs and others. In one embodiment, a method for Digital Subscriber Line (DSL) handshaking begins when a remote DSL transceiver transmits first signals containing even numbered carriers for a predetermined period of time to initiate the DSL handshaking to produce R-ETONES-REQ. The processing continues when a central office DSL transceiver detects the R-ETONES-REQ to produce detected R-ETONES-REQ. The processing continues when the central office DSL transceiver determines alignment of a hyperframe in accordance with a Time Compression Multiplexing-Integrated Service Digital Network (TCM-ISDN) Timing Reference (TTR). The processing continues when the central office DSL transceiver transmits first response signals containing odd numbered carriers in accordance with the alignment of the hyperframe to produce C-TONES-TTR. The processing continues when the remote DSL transceiver acquires TTR synchronization in accordance with the C-TONES-TTR. The processing continues when, after acquiring TTR synchronization, the remote DSL transceiver transmits second signals containing even numbered carriers to produce R-TONE-TTR. The processing continues when, in response to the R-TONE-TTR, the central office DSL transceiver transmits second response signals containing odd numbered carriers to produce C-GALF1-TTR. The processing continues when, in response to the C-GALF1-TTR, the remote DSL transceiver transmits third signals containing even numbered carriers to produce R-FLAG1-TTR. The processing continues when, in response to the R-FLAG1-TTR, the central office DSL transceiver transmits third response signals containing odd numbered carriers to produce C-FLAG1. With such a method, DSL handshaking is achieved for distances greater than 4 km.

DETAILED DESCRIPTION OF THE INVENTION

Figure 1:
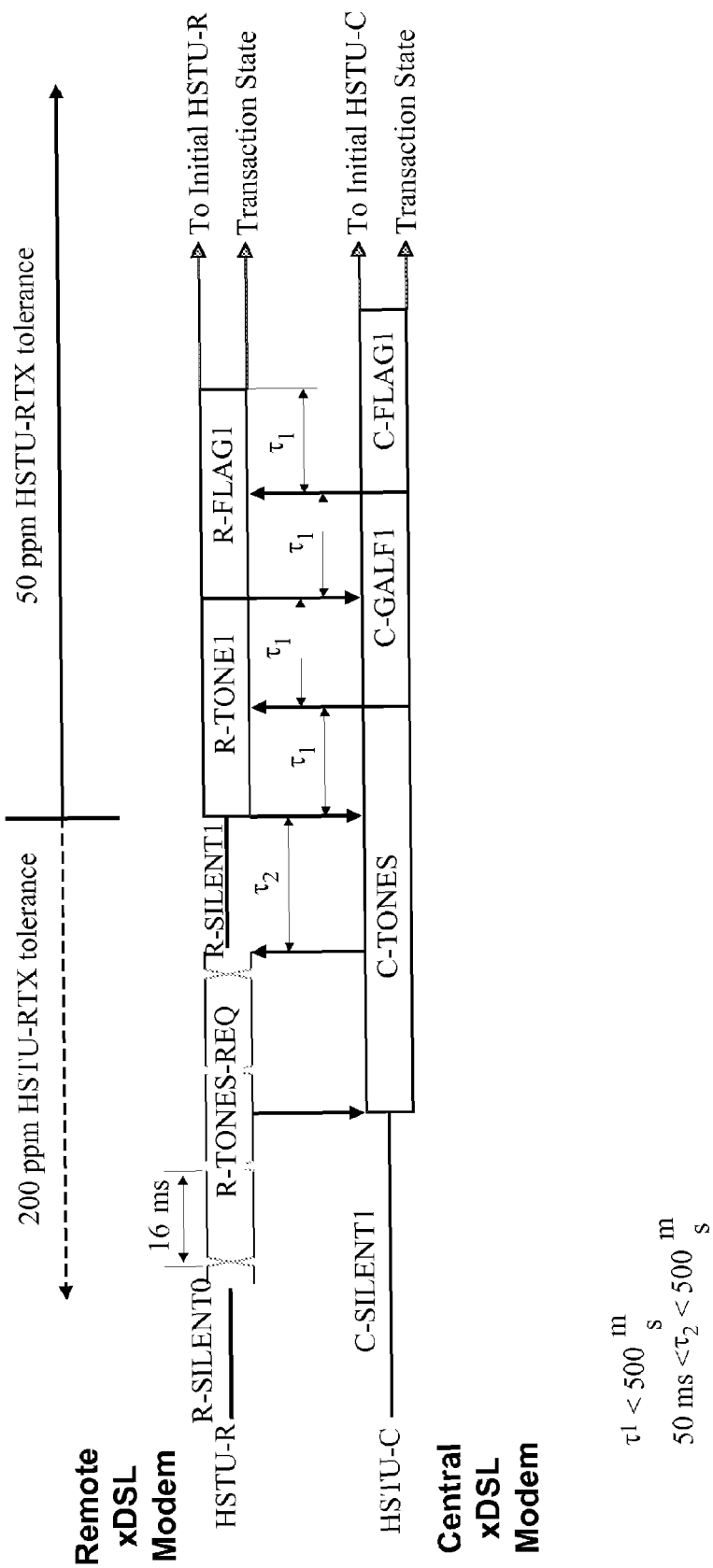
FIG. 1 is an illustration of a prior art duplex start-up procedure initiated by a remote xDSL modem.
Figure 2:
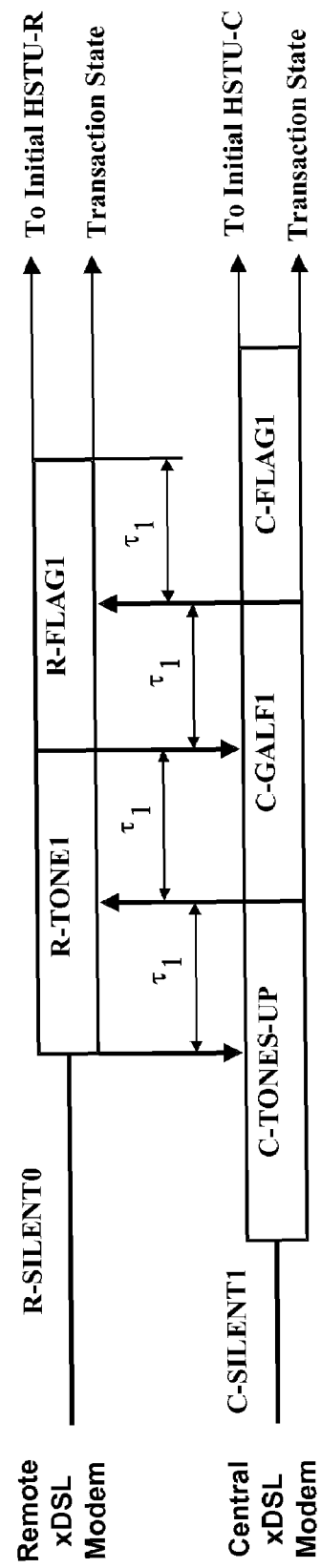
FIG. 2 is an illustration of a prior art duplex start-up procedure initiated by a CO xDSL modem.
Figure 3:
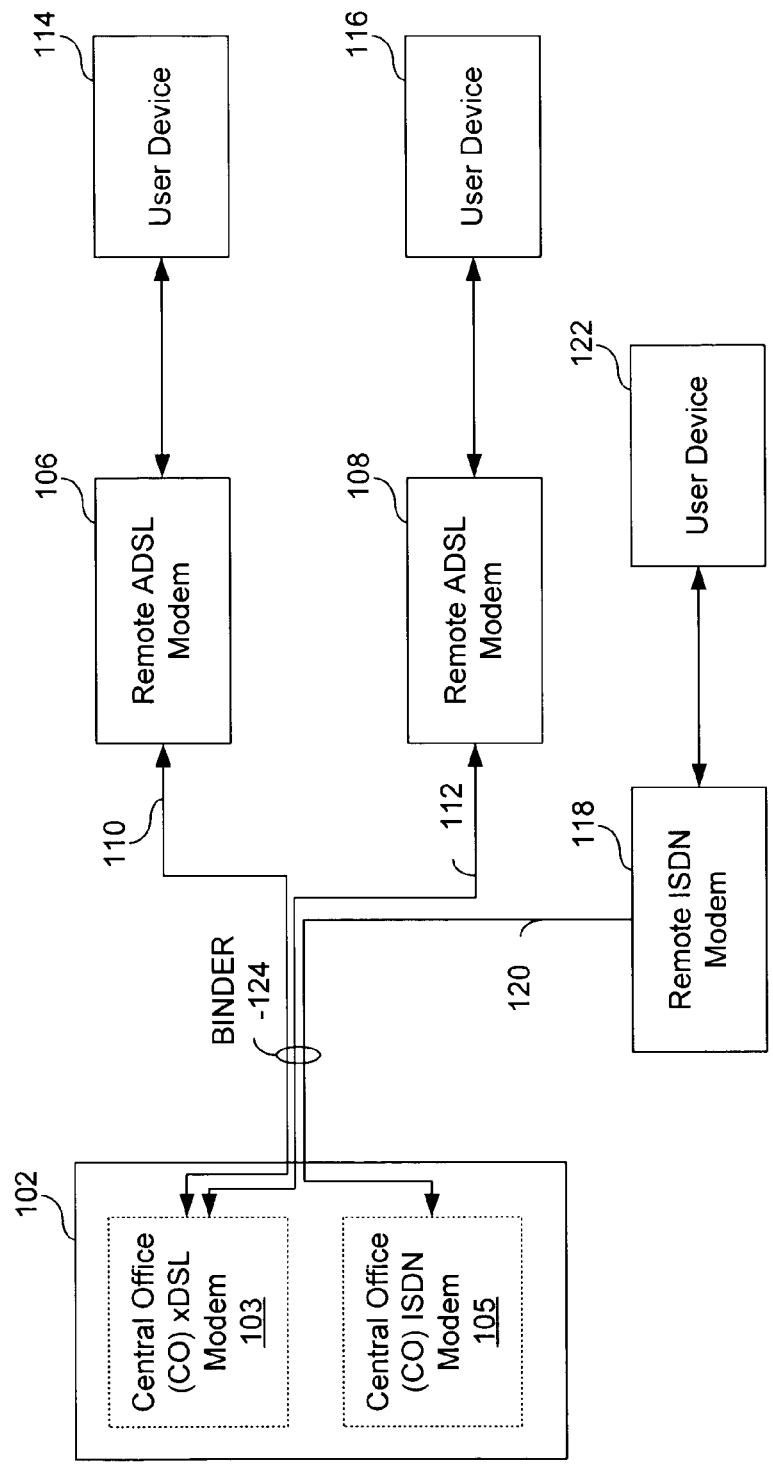
FIG. 3 is a high level block diagram of a communications system in accordance with embodiments of the present invention.

FIG. 3 is a high level block diagram of a communications system in accordance with embodiments of the present invention. The communication system includes a Central Office (CO) 102 that is owned/serviced by a phone company or other communications system service providers. The CO includes CO xDSL modem termination equipment 103 and CO ISDN modem termination equipment 105. The CO xDSL modem termination equipment 103 services remote ADSL modems 106 and 108 that service user devices 114 and 116, respectively. The CO ISDN modem termination equipment 105 services remote ISDN modem 118 that services user device 122. A binder 124 contains twisted pair (or other) wiring 110 and 112 that service remote ADSL modems 106 and 108, respectively, and also contains twister pair (or other) wiring 120 that services remote ISDN modem 118.

Each of the CO DSL modem 103 and remote DSL modems 106 and 108 includes a processing module and memory. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in FIGS. 4 and 5. As one of average skill in the art will appreciate, the xDSL modems may also be referred to as DSL transceivers.

Because twisted pair wiring 120 and twisted pair wiring 110 and 112 resides within binder 124, strong signal coupling may occur. In particular, the ISDN modem communications, serviced according to TCM-ISDN operations, for example may disturb handshaking signals of the xDSL components. Thus, according to the present invention, xDSL handshaking operations are modified to improve handshaking performance. Resultantly, longer distances (and poorer channels) between the CO 102 and the remote ADSL modems 106 and 108 are supported than were supported according to the prior art.

Figure 4:
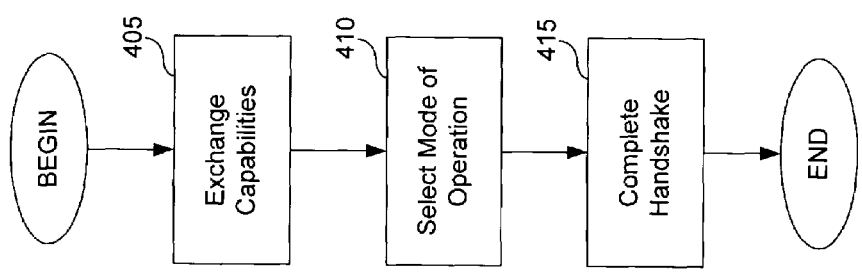
FIG. 4 is a flowchart of a method for handshaking xDSL modems in accordance with embodiments of the present invention.

FIG. 4 is a flowchart of a method for handshaking xDSL modems in accordance with embodiments of the present invention. Operation commences in which the xDSL modems (at CO and at customer premises) exchange capabilities (step 405). Once the capabilities have been exchanged, the xDSL modems select a mode of operation (step 410). Then, the handshake is completed (step 415).

Figure 5:
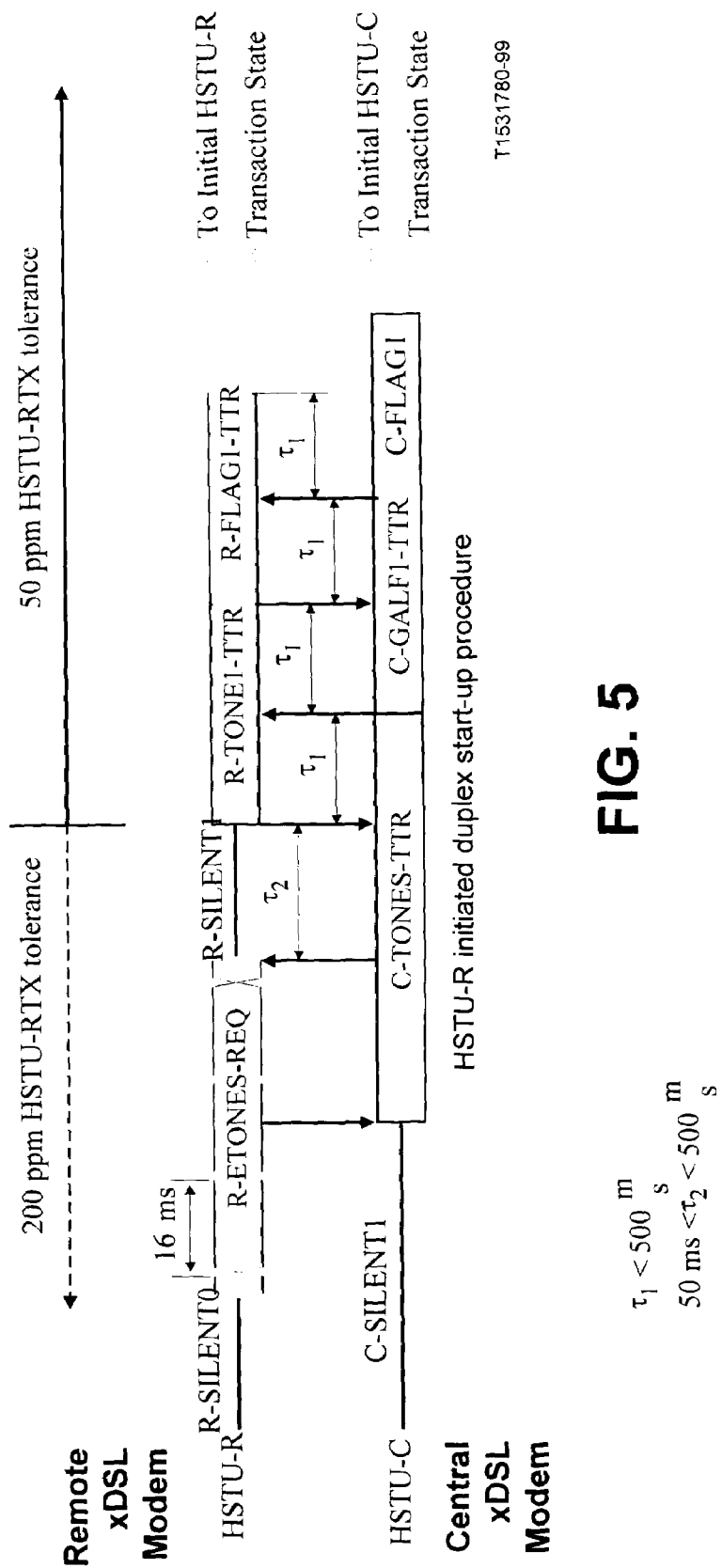
FIG. 5 is an illustration of a typical duplex start-up procedure initiated by a remote xDSL modem in accordance with embodiments of the present invention.

FIG. 5 is an illustration of a typical duplex start-up procedure initiated by a remote xDSL modem, transceiver (HSTU-R). Initially, the remote DSL transceiver is in state R-SILENT0 transmitting silence, and the central office DSL transceiver is in state C-SILENT1 transmitting silence. The remote DSL transceiver initiates the handshaking DSL procedure by transmitting first signals containing even numbered carriers for a predetermined period of time (e.g., up to two seconds) to initiate the DSL handshaking to produce R-ETONES-REQ. The first signals are signals from one or both of its signaling families (i.e., a group of carrier sets which are integral multiples of a given carrier spacing frequency, for example, 4.3125 KHz signaling family and 4 KHz signaling family) using only even numbered carriers, with phase reversals every 16 ms. The even numbered carriers may be eight through thirty less, carriers twelve and fourteen. After the transmission of the R-ETONES-REQ, the remote DSL transceiver may transmit conventional R-TONES-REQ in accordance with the G.994.1 specification until a response is received from the central office DSL transceiver or expiration of a time out period (e.g., a few seconds to tens of seconds).

As shown, the central office DSL transceiver (HSTU-C) detects the R-ETONES-REQ to produce detected R-ETONES-REQ subsequent to the commencing of their transmission. Upon detection, the central office DSL transceiver determines alignment of a hyperframe (i.e., as defined in G.992.1 specification) in accordance with a Time Compression Multiplexing Integrated Service Digital Network (TCM-ISDN) Timing Reference (TTR). Having determined the hyperframe alignment, the central office DSL transceiver transmits first response signals containing odd numbered carriers in accordance with the alignment of the hyperframe to produce C-TONES-TTR. The first response signals are odd numbered carrier signals from one or both of its signaling families, where the odd numbered carriers include five through thirty-one, less carriers seven and nine. In addition, the first response signals include periodic phase reversal (e.g., 16 millisecond (ms) phase reversal).

Upon receiving the C-TONES-TTR, the remote DSL transceiver resumes transmitting silence for 50 to 500 ms and attempts to acquire TTR synchronization from with the C-TONES-TTR. Upon acquiring TTR synchronization, the remote DSL transceiver transmits second signals containing even numbered carriers to produce R-TONE-TTR. The second signals include even numbered carrier signals from only one signaling family, where the even numbered carriers may be eight through thirty, less carriers twelve and fourteen.

In response to the R-TONE-TTR, the central office DSL transceiver transmits second response signals containing odd numbered carriers to produce C-GALF1-TTR. The second response signals include Galfs on odd numbered modulated carriers five through thirty-one, less carriers seven and nine.

In response to the C-GALF1-TTR, the remote DSL transceiver transmits third signals containing even numbered carriers to produce R-FLAG1-TTR. The third signals include flags on even number modulated carriers eight through thirty, less twelve and fourteen. Phase reversal may occur between symbols 7-8, 17-18, 28-29, 39-40, 50-51, . . . , 114-115, etc. Note that the start of the third signals is aligned with the TTR hyperframe.

In response to the R-FLAG1-TTR, the central office DSL transceiver transmits third response signals containing odd numbered carriers to produce C-FLAG1. When the remote DSL transceiver detects C-FLAG1, it begins the first transaction.

The preceding discussion has presented a method and apparatus for extending handshaking range in a DSL system. As one of average skill in the art will appreciate, other embodiments may be derived from the teachings of the present invention without deviating from the scope of the claims.

What is claimed is:

1. A method for Digital Subscriber Line (DSL) handshaking, the method comprises:
   transmitting, by a remote DSL transceiver, first signals containing even numbered carriers for a predetermined period of time to initiate the DSL handshaking to produce R-ETONES-REQ, wherein the first signals comprise a plurality of even numbered carriers eight through thirty and include periodic phase reversal;
   detecting, by a central office DSL transceiver, the R-ETONES-REQ to produce detected R-ETONES-REQ;
   determining, by the central office DSL transceiver, alignment of a hyperframe in accordance with a Time Compression Multiplexing-Integrated Service Digital Network (TCM-ISDN) Timing Reference (TTR);
   transmitting, by the central office DSL transceiver, first response signals containing odd numbered carriers in accordance with the alignment of the hyperframe to produce C-TONES-TTR, wherein the first response signals comprise odd numbered carriers five through thirty-one and include periodic phase reversal;
   acquiring, by the remote DSL transceiver, TTR synchronization in accordance with the C-TONES-TTR;
   upon acquiring TTR synchronization, transmitting, by the remote DSL transceiver, second signals containing even numbered carriers to produce R-TONE-TTR;
   in response to the R-TONE-TTR, transmitting, by the central office DSL transceiver, second response signals containing odd numbered carriers to produce C-GALF1-TTR;
   in response to the C-GALF1-TTR, transmitting, by the remote DSL transceiver, third signals containing even numbered carriers to produce R-FLAG1-TTR; and
   in response to the R-FLAG1-TTR, transmitting, by the central office DSL transceiver, third response signals containing odd numbered carriers to produce C-FLAG 1.

2. The method of claim 1, wherein the first signals comprise even numbered carriers eight through thirty less, carriers twelve and fourteen.

3. The method of claim 1 further comprises:
   subsequent to transmitting the first signals, transmitting, by the remote DSL transceiver, additional first signals from one or more signaling families to produce R-TONES-REQ.

4. The method of claim 1, wherein the first response signals comprises odd numbered carriers five through thirty-one, less carriers seven and nine.

5. The method of claim 1, wherein the acquiring, by the remote DSL transceiver, TTR synchronization further comprises:
   continue transmitting, by the remote DSL transceiver, the R-ETONES-REQ until the TTR synchronization is acquired.

6. The method of claim 1, wherein the second signals comprises even numbered carriers eight through thirty, less carriers twelve and fourteen.

7. The method of claim 1, wherein the second response signals comprises odd numbered carriers five through thirty-one, less carriers seven and nine.

8. A method for Digital Subscriber Line (DSL) handshaking, the method comprises:
   transmitting, by a remote DSL transceiver, first signals for a predetermined period of time to initiate the DSL handshaking to produce R-ETONES-REQ, wherein the first signals comprise a plurality of even numbered carriers eight through thirty less, carriers twelve and fourteen and include periodic phase reversal;
   detecting, by a central office DSL transceiver, the R-ETONES-REQ to produce detected R-ETONES-REQ;
   determining, by the central office DSL transceiver, alignment of a hyperframe in accordance with a Time Compression Multiplexing-Integrated Service Digital Network (TCM-ISDN) Timing Reference (TTR);

transmitting, by the central office DSL transceiver, first response signals in accordance with the alignment of the hyperframe to produce C-TONES-TTR, wherein the first response signals comprise a plurality of odd numbered carriers and include periodic phase reversal;

acquiring, by the remote DSL transceiver, TTR synchronization in accordance with the C-TONES-TTR;

upon acquiring TTR synchronization, transmitting, by the remote DSL transceiver, second signals to produce R-TONE-TTR, wherein the second signals comprise a plurality of even numbered carriers and include periodic phase reversal;

in response to the R-TONE-TTR, transmitting, by the central office DSL transceiver, second response signals to produce C-GALF1-TTR, wherein the second response signals comprise a plurality of odd numbered carriers and include periodic phase reversal;

in response to the C-GALF1-TTR, transmitting, by the remote DSL transceiver, third signals containing even numbered carriers to produce R-FLAG1-TTR; and in response to the R-FLAG1-TTR, transmitting, by the central office DSL transceiver, third response signals containing odd numbered carriers to produce C-FLAG1.

9. The method of claim 8 further comprises:

subsequent to transmitting the first signals, transmitting, by the remote DSL transceiver, additional first signals from one or more signaling families to produce R-TONES-REQ.

10. The method of claim 9, wherein the first response signals comprises odd numbered carriers five through thirty-one, less carriers seven and nine.

11. The method of claim 10, wherein the acquiring, by the remote DSL transceiver, TTR synchronization further comprises:

continue transmitting, by the remote DSL transceiver, the R-ETONES-REQ until the TTR synchronization is acquired.

12. The method of claim 11, wherein the second signals comprises even numbered carriers eight through thirty, less carriers twelve and fourteen.

13. The method of claim 12, wherein the second response signals comprises odd numbered carriers five through thirty-one, less carriers seven and nine.

* * * * *